(12) United States Patent
Petzitillo

(10) Patent No.: US 7,306,110 B2
(45) Date of Patent: Dec. 11, 2007

(54) SEALING CONTAINER DOOR WITH STAGES OF CLOSURE

(75) Inventor: Anthony D. Petzitillo, Winslow, NJ (US)

(73) Assignee: Wastequip, Inc., Cleveland, OH (US)

( * ) Notice: Subject to any disclaimer, the term of this patent is extended or adjusted under 35 U.S.C. 154(b) by 857 days.

(21) Appl. No.: 10/667,705

(22) Filed: Sep. 22, 2003

(65) Prior Publication Data

US 2004/0056029 A1    Mar. 25, 2004

Related U.S. Application Data

(60) Provisional application No. 60/412,660, filed on Sep. 20, 2002.

(51) Int. Cl.
B65D 88/00 (2006.01)
(52) U.S. Cl. .................................................. 220/1.5
(58) Field of Classification Search ................ 220/1.5, 220/1.6, 812
See application file for complete search history.

(56) References Cited

U.S. PATENT DOCUMENTS

| | | | |
|---|---|---|---|
| 2,288,926 A * | 7/1942 | Strader | 292/99 |
| 3,281,177 A * | 10/1966 | Tenenbaum | 292/241 |
| 5,639,129 A | 6/1997 | Lindley | |
| 6,364,153 B1 | 4/2002 | Petzitillo, Jr. et al. | |
| 6,929,146 B1 * | 8/2005 | Galbreath et al. | 220/833 |
| 2002/0088812 A1 | 7/2002 | Petzitillo, Jr. et al. | |

* cited by examiner

*Primary Examiner*—Anthony D. Stashick
*Assistant Examiner*—Harry A Grosso
(74) *Attorney, Agent, or Firm*—Duane Morris LLP

(57) ABSTRACT

A container has a hinging panel compressing a gasket against a door frame, preferably as an intermodal waste container. A spring biased catch is engaged by forcing the door panel beyond a certain point approaching its sealed position, for example by slamming the door. A lever-operated cam closure can then be engaged to fully compress the seal as the door panel is pulled to its sealed position. A clamping structure along a bottom edge of the door panel is adjustable to obtain an intermediate span of adjustment that is variable, along the bottom edge. A sill rod has fingers to grasp tabs on the bottom edge of the door. The pressure exerted at each tab is variable using a bolt adjustment. The individual adjustment can correct for wear or generally correct the tendency of the door panel to become bowed outwardly, thus reducing the incidence of leaks.

12 Claims, 4 Drawing Sheets

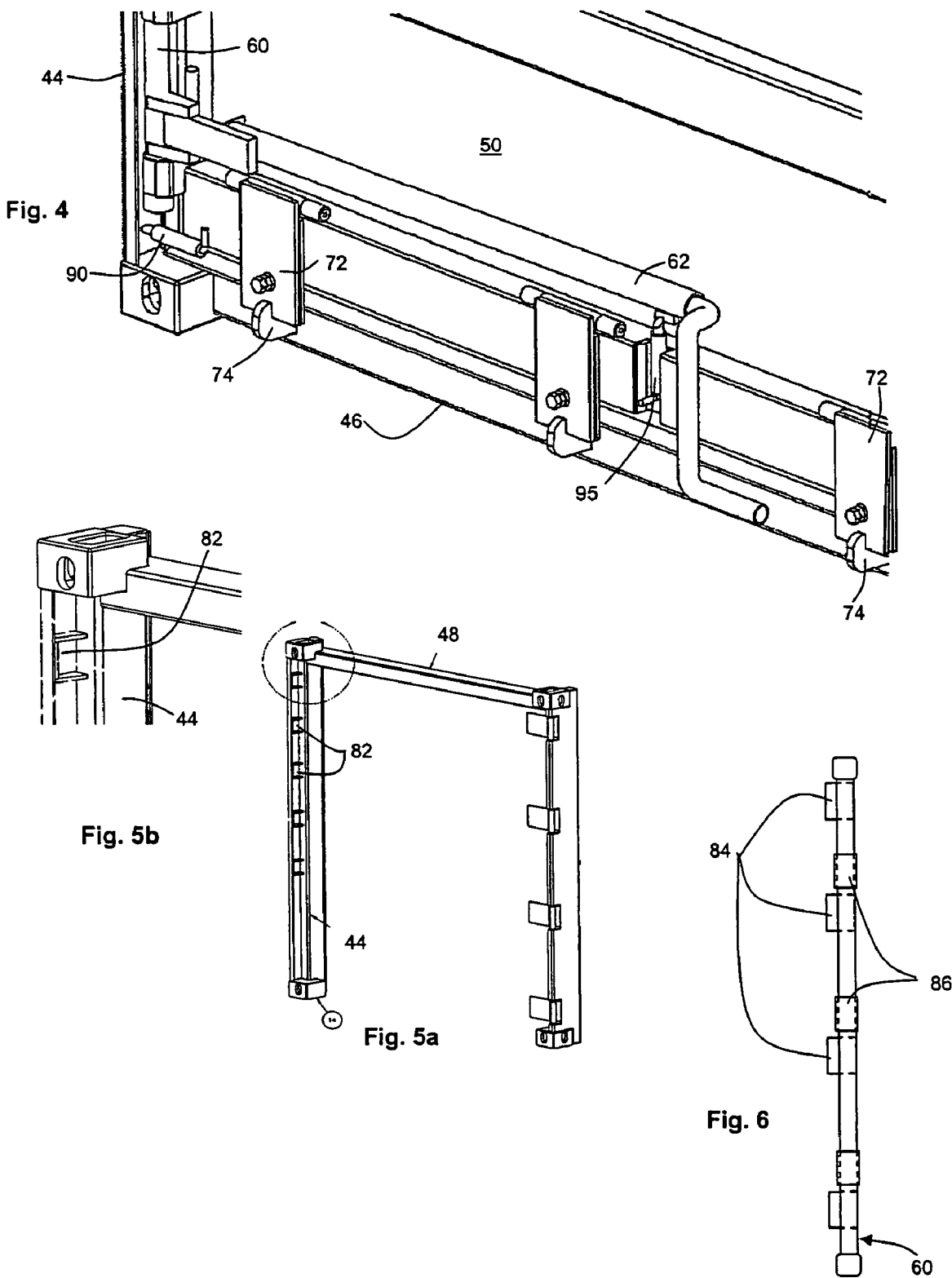

SEALING CONTAINER DOOR WITH STAGES OF CLOSURE

CROSS REFERENCE TO RELATED APPLICATION

This application claims the priority of U.S. Provisional Application Ser. No. 60/412,660, filed Sep. 20, 2002.

BACKGROUND OF THE INVENTION

The invention relates to closing and sealing structures that mount a hinged door panel to a framed opening in a container, such as an end door panel of a heavy duty intermodal container, so as to exert closing pressure against a seal.

Containers such as intermodal containers used to hold and ship bulk materials, refuse containers for waste material, compactor containers and the like, are advantageously provided with closures at reinforced framed openings in a side or end wall. There are various standard sizes, particularly for intermodal containers, but a typical standard container is a generally rectilinear box and may measure twenty or forty feet in length, from four to twelve feet high and eight feet laterally, and is made of steel plate with reinforced frame parts comprising rectangular tubing, angle iron and bar stock.

The end wall can be partly or wholly occupied by one or more door panels. In semi-trailer applications, two panels are hinged at the outer vertical corners and lap one another at the midline of the container in the rear. For waste containers and other applications requiring a sealing door, one panel is provided to close the end of the container and is arranged to seal against a frame provided around the end wall opening. The seal can be made using a compressible gasket material mounted to the door panel or to the frame. The door panel, like the container as a whole, needs to be structured for rough handling. Mounting the heavy door panel for opening, closing and sealing, preferably by manual operations by a single operator, while also achieving the precision needed for achieving a preferably water-tight seal, are challenging design objectives.

The door panel is carried on a hinge, i.e., a pivot axis along the frame at one side of the end wall. Usually the hinge axis oriented vertically, but in a dumping container the hinge axis could advantageously be horizontal. A sealing door panel preferably has a single integral panel as large as the opening, but two panels hinged on opposite sides of the opening are possible, as are two or more panels with an intermediate accordion fold hinge. Various mechanisms can releasably hold the door panel(s) in a closed position, typically involving a latching connection between the door panel and the frame of the doorway, at one or more points remote from the hinge axis.

For convenience of discussion, this disclosure refers primarily to an integral door panel having a vertical hinge axis along one lateral edge or corner of the container and a latching connection along a frame at the opposite edge. It should be appreciated that many of the same considerations apply to other configurations and orientations.

Container structures vary depending on use as shipping containers or waste containers, both types being optionally structured for intermodal shipping. Containers may also be arranged for roll-on/roll-off loading, tip-dumping using a forklift or tined overhead dumping collection truck, coupling to a compactor head, etc., by providing the necessary structures. All such containers advantageously can have an access door and the door advantageously seals.

An exemplary container with intermodal standardized fittings is known from U.S. Pat. No. 6,364,153-Petzitillo. This container has both top and end openings that can seal. For sealing purposes, the openings each have a compressible gasket material mounted around the perimeter of the sealed opening. The closure panel is configured to be compressed and to seal against the door. The gasket material might be carried by the door panel or by the container frame, but in either case, the moutning mechanism for the door panel needs to be configured so as to press the door panel against the frame and thereby to compress the seal or gasket.

A hinged door panel inherently applies greater force to the seal near the hinging axis and less force farther from the hinging axis, due to simple mechanical leverage. This has practical implications. It is desirable to apply sufficient force against the sealing plane all around the seal, to obtain and maintain a preferably watertight seal barrier. It is desirable to avoid crushing the gasket close to the hinge, which over a number of repetitions of opening and closing will permanently compress the gasket material there. The mechanical arrangements must permit the operator manually to exert pressure against the door panel sufficient to close the door against the seal. In a heavy duty container, this includes applying sufficient pressure against a heavy hinging door panel to compress a relatively stiff gasket material along the edge of the panel that is opposite from the seal. In a container that may contain liquids or a combination of solids and liquids, particularly a waste container, it is also advantageous to pay particular attention to the seal along the lower edge of the container to prevent fluid leakage.

The Petzitillo '153 patent illustrates several techniques for pressing the door panel inwardly against the seal to meet the foregoing practical objectives. The hinge axis is displaceable on the hinging side, toward and away from the seal. Normally the seal is achieved along a sealing plane, but the seal might not be limited to a plane, e.g., the seal can be stepped or slanted or otherwise arranged.

On the hinge axis side in the '153 patent, and also on the opposite side (generally the latching side), one or more ratchet binders is mounted to exert a force pulling the door panel against the seals. A ratchet binder is a ratchet-pawl threaded turnbuckle-like connection, used to foreshorten the distance between ends at which the ratchet binder is permanently or releasably attached. Other similar force exertion mechanisms could also be used, such as toggling bale clamps, hydraulic or pneumatic spring cylinders, etc.

Along the bottom edge of the panel at the sill of the opening, compression flaps are mounted on a horizontal pivot axis and can be rotated against the bottom edge of the door panel. These flaps can help to apply additional force specifically along the bottom edge of the panel, as a means to offset the effects of leverage that tend to apply more force near the hinge axis and less force at points spaced from the hinge axis.

The flaps can be pivoted downwardly to clear the way for the door panel to pivot open. An alternative technique in containers available from Wastequip, Inc., Cleveland, Ohio (www.wasteguip.com) uses hooked locking fingers mounted on a lock shaft provided along the sill to grasp spaced tabs welded along the bottom edge of the panel. The hooks are mounted commonly on the horizontal lock shaft under the sill and the lock shaft is movable perpendicular to the seal plane. Thus, pressure applied to the ends of the lock shaft can adjust the extent to which the locking fingers exert pressure on the door panel, normally increasing the sealing pressure applied on the bottom edge of the panel to better seal against leakage.

The lock shaft can be biased to apply more pressure to locking fingers that are remote from the hinging axis, and thus to offset uneven effects of hinge leverage). Inasmuch as the lock shaft and the locking fingers are mounted in a straight line, the variation in applied pressure is linear across the bottom edge of the door panel.

The foregoing arrangements are directed to the hinging and bottom edges of the door panel. Closure arrangements, preferably including the application of pressure against the seal, also are needed along the edge of the door panel that is parallel to the hinge axis but on the opposite side of the door panel. A gate latch is possible, but this edge also needs to seal, and does not benefit from hinge leverage. Pressure also needs to be applied, preferably at a level that is comparable to the pressure applied on the hinged side having the benefit of hinge leverages. In the '153 patent, ratchet binders apply adjustable pressure.

In certain door closures, typified by the bi-panel door closures on the rear doors of semi-trailers, a cam lock arrangement is provided to make a latching closure remote from the hinge axis. Normally, the cam lock arrangement is at the midpoint of the rear opening of the semi-trailer. The cam lock attaches the panels to one another and potentially also locks at least an outer one of two lapped panels to the doorway header and sill members framing the top and bottom edges of the doorway. A locking rod is mounted along and parallel to the closure edge of the outer panel and has an operating handle that extends perpendicular to the locking rod. One or more eccentric cams (e.g., a cam at each end of the lock rod) extends from the locking rod. The cam is angularly spaced from the lever handle on the lock rod and aligns with a receiving pocket in the opposed panel or in the header or sill frame members. The operator swings the doors to a point where they are almost but not entirely closed, fits the cam or cams into the pocket(s) and rotates the lock rod using the lever handle. Rotation of the lock rod causes the cams to bear against the pockets and pulls the panels closed.

A cam lock handle as described requires some coordination in the operation of the lever handle and the position of the door panels. Specifically, the panels must be held manually in a nearly-closed position to align the cams and the cam pockets. This has proven to be difficult to accomplish with heavy duty sealing waste container door panels because the sealing gaskets are stiff and difficult or impossible for an operator to compress simply by pushing against the door panel.

It would be advantageous if a heavy sealing door panel could be closed conveniently, possibly including coupling of cams and pockets, but without requiring the exertion of preliminary pressure sufficient to hold the door shut. It would also be advantageous to provide a sealing door panel that facilitates application of evenly balance sealing pressure, not only at the latch side versus the hinging side, but also along the bottom or sill edge of the panel

SUMMARY OF THE INVENTION

The invention overcomes a number of practical and operational problems associated with the structure and use of sealing containers.

A container particularly apt for a sealing waste container is provided with certain closing and sealing arrangements for a container hinging door panel in a door frame. A compressible sealing gasket is compressed between the door panel and elements of the frame, under an operative sealing pressure when the container closure is sealed. This seal can be difficult to compress. A spring biased catch is engaged by forcing the door panel beyond a certain point approaching its sealed position, for example by slamming the door. This brings a lever-operated closure into range of engagement. The lever closure has eccentric cams received in pockets in the door frame for compressing the seal on the edge opposite from the hinge axis. The closure also has a clamping structure along a bottom edge of the door panel, which is adjustable to obtain an intermediate span of adjustment that is variable, along the bottom edge, in a direction of the sealing gasket. This bottom edge adjustment involves clamping tabs engaged by a sill rod that can be tensioned at its ends to generate force at a linearly variable pressure along the bottom edge, especially to exert more sealing pressure proceeding away from the hinge axis. Additionally, the pressure exerted at each tab is variable using a bolt adjustment that effectively increases or decreases tab thickness to correspondingly adjust sealing pressure. The individual adjustment can correct for wear or generally correct the tendency of the door panel to become bowed outwardly, thus reducing the incidence of leaks.

BRIEF DESCRIPTION OF THE DRAWINGS

FIG. 4 is a somewhat enlarged version of FIG. 3, showing details of the structure and mechanisms.

FIGS. 5a and 5b are respective full and partial isometric views showing the framing members on the hinge, header and sill parts of the door frame.

FIG. 6 is an elevation view showing a cam locking shaft that is mounted on the door panel and engages with the frame members shown in FIGS. 5a, 5b.

DETAILED DESCRIPTION OF THE PREFERRED EMBODIMENTS

Figure 1:
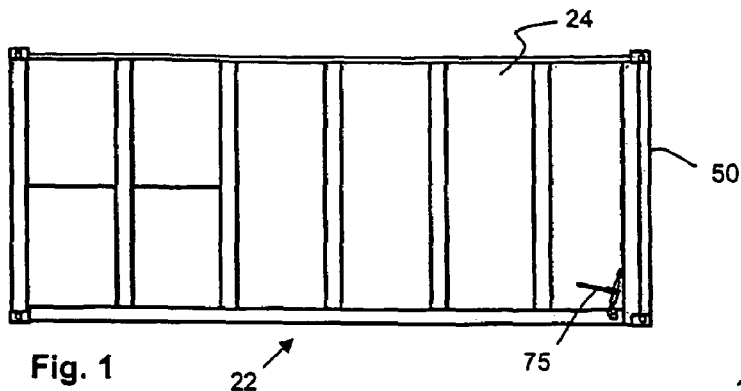
FIG. 1 is an elevation view of an intermodal embodiment of the container of the invention.
Figure 2:
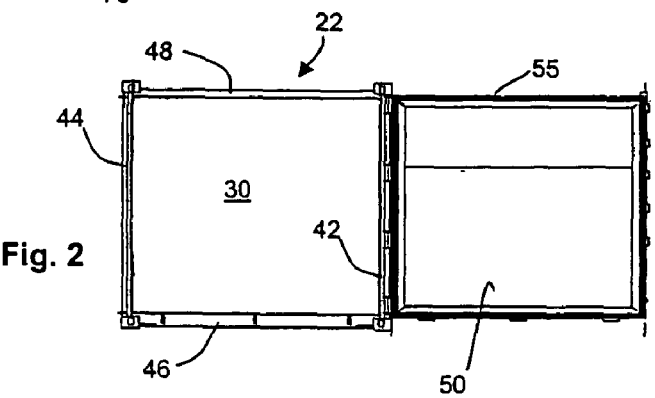
FIG. 2 is an end view of the container shown in FIG. 1, with the end door panel swung open.
Figure 3:
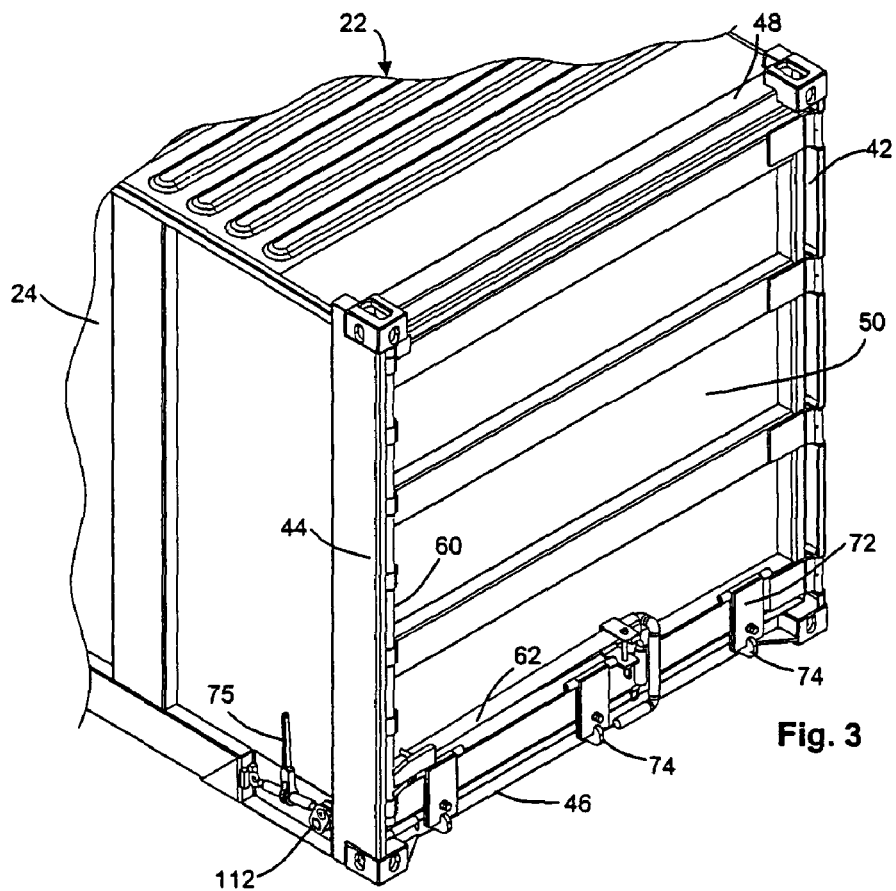
FIG. 3 is a partial perspective view of the end door, shown closed.
Figure 7:
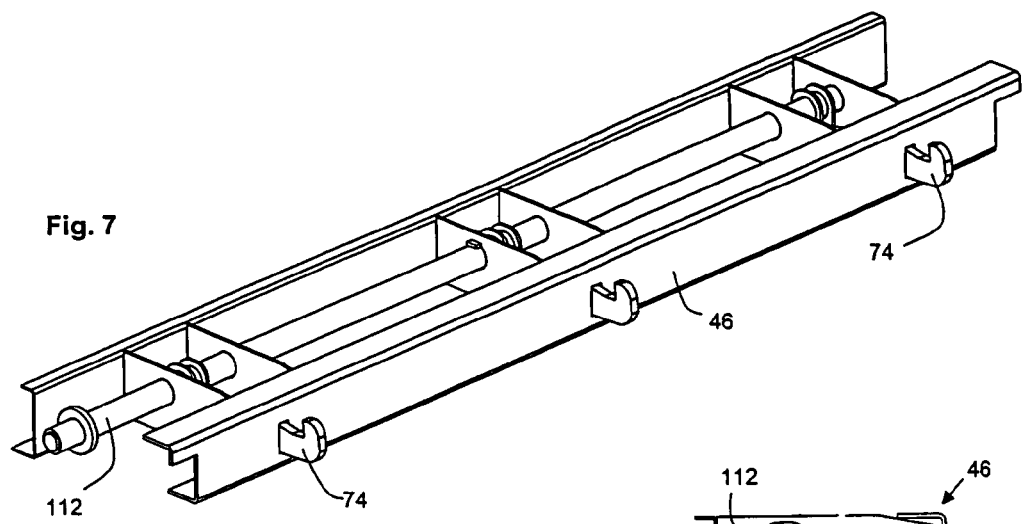
FIG. 7 is an isometric showing the sill mechanism with adjustable fingers for engaging the bottom edge of the door panel.
Figure 8:
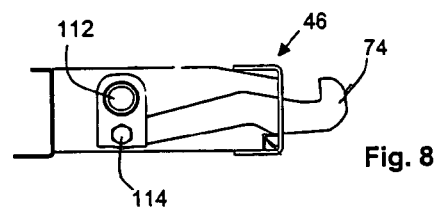
FIG. 8 is an end elevation view of the sill mechanism shown in FIG. 7.

A container 22 such as an intermodal type waste container is shown in FIGS. 1-3. The container is generally a rectilinear box and has a container body defining at least side walls 24 and a bottom 26, the example shown also having a top. The container body is supported by a number of frame elements that need not be described in detail, the frame elements pertinent to this disclosure being those associated with a container closure provided by an opening or doorway 30. The doorway 30 can potentially be in a side wall, but in the preferred example shown the doorway 30 substantially occupies an end of the container 22. Thus the respective frame elements forming the door opening 30 comprise spaced vertical frame elements including a hinge side frame or jamb element 42, a latch side frame element 44. A sill or bottom side frame element 46 and a header 48.

The respective corners of the container shown are outfitted with standard intermodal fittings that are spaced and configured for use with different types of handling equipment. The invention is not limited to intermodal containers, however, and is likewise applicable to custom sizes and types such as roll-on/roll-off containers, compactor containers and other sorts.

FIG. 2 shows the container door panel 50 swung open, and FIG. 3 shows the door panel 50 in its closed and sealed position. The door panel 50 is sized to fit the door opening 30, the door panel 50 being hingedly attached relative to the frame at the hinge side post 42 and being movable to occupy the door opening by hinging around the axis of one or more hinges thereon.

A compressible sealing gasket 55 is carried by at least one of the door panel 50 and the frame elements 42-48. The gasket 55 is shown mounted in the edge of panel 50 in FIG. 2. The gasket 55 can be a solid or celled rubber or polymer material as known in the art. The gasket 55 is compressed between the door panel 50 and the frame elements when the door is closed and sealed. Inasmuch as the container is a rather heavy duty apparatus, the seal is stiff, durable and requires substantial force to compress to the operative sealing pressure needed when the container closure is sealed, i.e., when the door panel occupies its container closing position in the door opening. On the other hand, in order for the container to be effectively sealed, the seal position and compression must be rather precise.

The closure of the invention employs complementary arrangements for urging the door panel 50 against the frame elements 42-48, and thus to compress seal 55. Along the edge opposite from the hinge, namely at frame element 44, the closure has a cam-engaging clamping rod 60 operated by a lever handle 62 that can be pivoted up from the plane of the door panel 50 around an axis parallel to clamp rod 60.

According to one aspect, the clamp rod has an associated spring biased catch, to hold panel 50 in an almost-closed position where the cams on the clamping rod 60 can be inserted initially into their cam pockets in frame 44.

According to another aspect, the sill or bottom edge of the door has a series of tab elements 72 that can be engaged by sill fingers 74. The sill fingers are mounted on a clamp rod (not shown in FIG. 3) that is movable mounted in the structure of sill 46. Specifically, the fingers 74 can be rotated up to grasp tabs 74, and also the full array of sill fingers 74 can be pulled forward in the sealing direction using a ratchet binder 75 along the side wall of container 22.

By applying pressure to the end of the array of sill fingers 74, it is possible to apply pressure in the sealing direction in an amount that varies linearly across the length of the sill. This can be used to offset the inherent difference in pressure caused by leverage wherein the door panel tend to exert more pressure on the seal near the hinge frame side 42 due to mechanical advantage.

According to another aspect, however, the tabs 74 are individually adjustable to apply more or less sealing pressure locally. This adjustment capability allows pressure to be applied where needed to maintain a precise seal. Thus, for example, if the panel 50 becomes centrally bowed outward, more pressure can be applied at the central tabs 72 versus the lateral ones. If over time the mechanical advantage of the hinge results in more crushing at the hinge side than opposite, this can be accommodated by suitable adjustments to the position at which the sill fingers 74 fit against tabs 72.

One or all of these aspects can be applied to improve sealing as well as to make the closure operation convenient for the operator. That is, at least one closing mechanism is provided for holding together the door panel and the frame elements in conjunction with compression of the gasket, in addition to the basic closure of panel 50 on seal 55. The one or several closing mechanisms are disposed along at least part of the respective edge 44, 46 of the door opening.

FIGS. 4-6 illustrate particulars of the clamping arrangements for affixing the free side of panel 50 to frame 44 (opposite from the hinge side) and to apply pressure. At the same time, however, the structure has an intermediate state wherein the door panel 50 is held ajar, leaving a space, or at least such that the door panel 50 is held against the gasket 55 at a sealing pressure that is less than the operative sealing pressure, while the cam clamping mechanism of clamping rod 60 is coupled and operated.

As shown in FIG. 5a, and more particularly in FIG. 5b, the non-hinge size jamb or frame element 44 comprises a channel facing inwardly, with a series of cam pockets 82 being defined between channel divider webs. Cam bar 60 is mounted on the surface of door panel at the corresponding non-hinge edge and presents cams 84 for receipt in the pockets 82. Rotation of bar 60 advances or retracts cams 84, which are radial projections welded on bar 60. The bar 60 is rotatably supported on panel 50 by bushings 86.

At least one spring biased catch device 90 is mounted at the free edge of panel 50. The catch device (shown in detail in FIG. 11) has a tenon that is biased to extend toward the channel in frame 44 containing pockets 82. However, the catch device passes the outer flange of the channel at a position in which the door panel 50 is still ajar. In order to rotate the door panel 50 into a position at which the catch 90 passes and locks in frame 44, the operator must compress the seal 55, particularly in the area near the hinge side. This can be very difficult due to the stiffness of the gasket 55. In order to move panel 50 to a position wherein it panel 50 is close enough to cause eccentric cam tabs to fit behind the flange in the frame member 44, the panel 50 must be brought to a position against and at least partly compressing gasket 55.

It is possible to more or less slam the heavy panel 50 against the gasket 55, compressing the gasket 55 momentarily due to the inertia of the hinging panel 50. If the timing is just right, the cam lock bar can be rotated using by the operator using handle 62 at exactly the right moment to cause the cam tabs 84 to enter the channel, and also immediately to press lever handle 62 down into the position shown in FIG. 4. This timed and coordinated operation is difficult to achieve.

However if the door panel 50 according to the invention is simply "slammed" when the handle 62 is in the open position, the spring catch 90 operates, thus engaging the door at a position that is slightly ajar and places the cam tabs 84 in position to engage in pockets 82 in the channel of frame 44 without any complicated timing or the like. the closing mechanism holds the door panel against the gasket at a sealing pressure that is less than the operative sealing pressure.

Accordingly, the closing mechanism as shown has a catch 90 for holding the door panel 50 to one of the frame elements 44, remote from the hinge side 42. The spring catch 90 engages prior to the door panel 50 reaching the closing position at which the seal is fully compressed. A benefit of making the catch 90 spring biased is that it will engage and position the door panel in an intermediate state after the door panel 50 is momentarily moved toward the closing position beyond the intermediate state. That is, slamming the door positions it for engagement of the catch and the catch is place to hold the door panel 50 where needed to operate the mechanical clamping aspects of lock bar 60, and to place eccentric tabs 84 in position to fit their pockets 82. At that point, the door clamping mechanism 60, 84, 82 is operable to advance the door panel from the intermediate position ajar, to the closing position.

For this purpose, the door clamping mechanism comprises rotatable locking bar 60 having at least one eccentric cam 84 and preferably a series of cams 84 as shown. These are operated by the manual lever handle 62*m* which extends radially from the locking bar 60. A further spring catch 95 is mounted on the door panel 60, for example at a gap in a rib formed by a length of rectangular tubing, as shown in FIG. 4, for affixing the manual lever handle in a locking position against panel 50 and adjacent to the tubing rib.

In the preferred arrangement, the rotatable locking bar is disposed on an edge of the door panel parallel to and opposite from the hinge axis, namely at frame member 44. It would be possible alternatively or additionally to provide a similar structure on one of the other edges, such as the header or top frame member 48.

The foregoing arrangements solve some practical problems associated with getting the door panel shut up to the point that mechanical clamping arrangements can be employed to compress the panel 50 against the gasket. According to another aspect, the sealing pressure applied can be made variable. That is the pressure applied locally by panel 50 in the direction of sealing gasket 50 can be different at different points along the associated edge of panel 50. This aspect of the invention is illustrated in FIGS. 4 and 7-10, in a manner that employs a particular structure for the sill 46 and the respective tabs 72 engaged by fingers 74 of the sill.

The container 22 has a clamping structure along a bottom edge of the door panel 50, which is generally known, but the particular structure employed is made to facilitate the application of pressure at different levels at different points across the bottom of panel 50.

The structure of sill 46 includes a lock rod 112 to which the fingers or hooks 74 are affixed whereby rotation of rod 112 applied pressure by hooks 74 to the bottom edges of tabs 72. This pressure can be applied in different ways. According to the depiction in FIGS. 7 and 8, the finger hooks 74 are at the ends of elongated plates that are affixed to bar 112 at eccentric bolts 114. Therefore, rotation of lock rod 112 in a clockwise direction in FIG. 8 pulls hooks 74 toward the sealing plane of gasket 55. The eccentric could alternatively be above lock bar 112, for example so that ratchet binder 75 as shown in FIG. 3 exerts pressure in the required direction toward the seal 55.

In the embodiment shown in FIG. 3, a ratchet binder 75 is shown only on the non-hinge side. This ratchet binder can be used exclusively to apply pressure to the fingers 74 along the sill edges, or a ratchet binder (not shown) can also be provided on the opposite or hinged side. As another possibility, the entire mounting of lock rod 112 in FIG. 7 can be allowed to float and biased so as to apply more pressure on the end remote from the hinge, e.g., at ratchet binder 75 in FIG. 3, so as to apply more sealing pressure at the end remote from the hinge and less near the hinge, where hinge leverage already assists in compressing the seal.

According to another aspect, however, the pressure applied by fingers 74 can be adjusted locally across sill 46 by changing the position of the tabs 72 at which the fingers 74 engage. That is, the clamping structure along the bottom edge is adjustable to obtain an intermediate span of adjustment that is variable, along the bottom edge, and can be more or less in the direction of the sealing gasket, locally at each tab 72. This involves at least two clamping tabs 72 affixed to the bottom edge of door panel 50, and at least two corresponding clamping fingers 74 mounted on a sill of the door opening, the clamping fingers 74 being movably mounted to apply pressure against the clamping tabs 72. Preferably, three or more such finger/tab engagements are provided, wherein the clamping fingers 74 are mounted on a lock shaft 112 that is rotatable or linearly displaceable in a direction normal to the sealing plane for applying sealing pressure.

Although the lock shaft can be coupled to the container by force exertion means at least at one end of the lock shaft 112 that applies local force at a level that varies linearly along the lock shaft, a similar variation can be obtained by providing adjusting elements for varying the local force from the level that is otherwise applied along the shaft 112.

Figure 9:
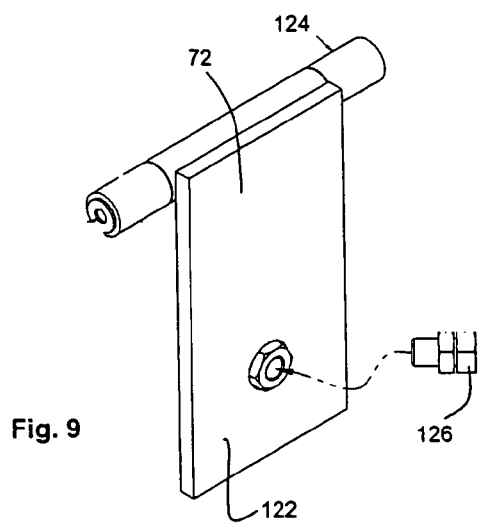
FIG. 9 is an isometric view showing only the outer plate portion of one of several adjustable door tabs engaged by the fingers of the sill mechanism.
Figure 10:
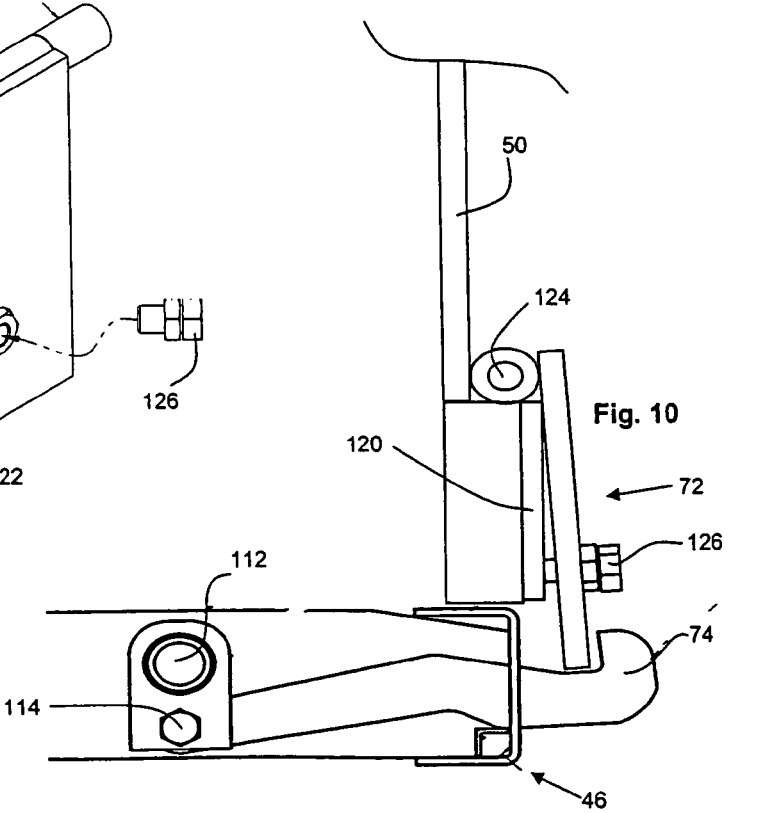
FIG. 10 is an elevation view, partly in section, showing a finger of the sill mechanism engaging the adjustable tab.

As shown in FIGS. 9 and 10, the adjusting elements for varying the local force can include a mechanism for individually varying a position of an operative surface of each of the clamping tabs 72. The clamping tabs 72 in this embodiment comprise a base part 120 that can be part of the door panel 50, and a movable hinge leaf functioning as a clamp plate 122 mounted on a hinge pin 124. The clamp plate 122 can be displaced from the base part 122 of tab 72, thus effectively varying the operating position of the clamping tabs 72 individually. For this purpose, a bolt 126 is threaded into plate 122 and provided with a locknut, the extension of the shaft of the bolt controlling the relative position of the surface of tab 122 engaged by finger 74.

Figure 11:
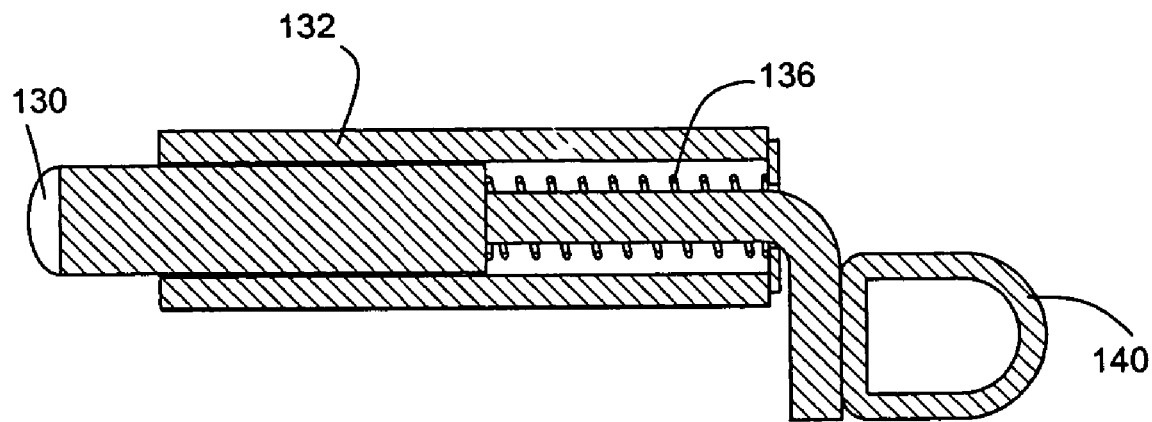
FIG. 11 is a section view showing the structure of the slammer latches provided for both the door panel and the lever handle.

FIG. 11 shows a mechanism for use as the spring clip 90 for holding panel 50 at its intermediate position slightly ajar, and the spring clip 95 by which the lever handle 62 can be locked in place. These spring claims have a lock pin 130 biased in a bushing 132 by a washer 136. A back end pull ring 140 or a similar structure is provided so that the pin can be pulled into a retracted position for releasing the pin. The pull ring can have an associated holder where the pin can be held as retracted. Alternatively, the pin can be retracted momentarily. Preferably the nose of the pin 130 is rounded or inclined so as to be pushed back when encountering an obstruction.

The invention has been described with respect to certain preferred embodiments, but the invention is not limited only to the particular constructions disclosed and shown in the drawings as examples, and also comprises the subject matter and such reasonable modifications or equivalents as are encompassed within the scope of the appended claims.

What is claimed is:

1. A container, comprising:

a container body defining at least side walls and a bottom, and having frame elements at least partly forming a door opening with a hinge side, a latch side and a bottom side;

a container closure including a door panel sized to fit the door opening, the door panel being hingedly attached relative to the frame elements at the hinge side and being movable to occupy the door opening;

a compressible sealing gasket carried by at least one of the door panel and the frame elements, the gasket being compressed between the door panel and the frame elements up to the hinge side, under an operative sealing pressure when the container closure is sealed with the door panel occupying a closing position in the door opening, wherein compression of the gasket resists hinging movement of the door panel into the closing position;

at least one closing mechanism for holding together the door panel and the frame elements in conjunction with said compression of the gasket, the closing mechanism being disposed along at least part of an edge of the door opening;

wherein the closing mechanism has an intermediate state wherein the gasket is engaged by the door panel at a sealing pressure less than the operative sealing pressure while the door panel is ajar;

a door clamping mechanism operable to advance the door panel by further hinging movement from the intermediate state to the closing position, wherein the door clamping mechanism comprises a rotatable locking bar having at least one eccentric cam, and a manual lever handle extending radially from the locking bar, the cam being received in a cam pocket in an associated one of the frame elements when the door panel is in the intermediate state, such that the door clamping mechanism is in range to be closed using the lever handle; and, a spring catch configured to hold the door panel in the intermediate position when the door panel is forced to compress the gasket.

2. The container of claim 1, wherein the catch is spring biased to engage and is positioned to hold the door panel in the intermediate state after the door panel is momentarily moved toward the closing position beyond the intermediate state, whereby slamming the door results in engagement of the catch.

3. The container of claim 1, wherein the rotatable locking bar is disposed on an edge of the door panel parallel to and opposite from the hinge axis.

4. The container of claim 3, wherein the hinge axis is oriented vertically at one lateral side of the door panel and further comprising a plurality of said eccentric cams, the cams being spaced along the edge of the door parallel to and opposite from the hinge axis.

5. The container of claim 4, further comprising at least one clamping structure along a bottom edge of the door panel, said clamping structure along the bottom edge being adjustable to obtain said intermediate span of adjustment that is variable, along the bottom edge, in a direction of the sealing gasket.

6. The container of claim 1, further comprising at least one clamping structure along a bottom edge of the door panel, said clamping structure along the bottom edge being adjustable to obtain said intermediate span of adjustment that is variable, along the bottom edge, in a direction of the sealing gasket.

7. A container, comprising:

a container body defining at least side walls and a bottom, and having frame elements at least partly forming a door opening with a hinge side, a latch side and a bottom side;

a container closure including a door panel sized to fit the door opening, the door panel being hingedly attached relative to the frame elements at the hinge side and being movable to occupy the door opening;

a compressible sealing gasket carried by at least one of the door panel and the frame elements, the gasket being compressed between the door panel and the frame elements under an operative sealing pressure when the container closure is sealed with the door panel occupying a closing position in the door opening;

at least one closing mechanism for holding together the door panel and the frame elements in conjunction with compression of the gasket, the closing mechanism being disposed along at least part of an edge of the door opening;

wherein the closing mechanism has at least one of an intermediate state wherein the door panel is held ajar, and an intermediate span of adjustment that is variable along the edge in a direction of the sealing gasket;

at least one clamping structure along a bottom edge of the door panel, said clamping structure along the bottom edge being adjustable to obtain said intermediate scan of adjustment that is variable, along the bottom edge, in a direction of the sealing gasket; and, wherein the clamping structure along the bottom edge comprises at least two clamping tabs affixed to the bottom edge and at least two corresponding clamping fingers mounted on a sill of the door opening, the clamping fingers being movably mounted to apply pressure against the clamping tabs.

8. The container of claim 7, wherein the clamping fingers are mounted on a lock shaft that is rotatable to wrap the clamping figures over the clamping tabs.

9. The container of claim 8, wherein the lock shaft is coupled to the container by force exertion means at least at one end of the lock shaft, whereby application of the force exertion means applies local force at a level that varies linearly along the lock shaft.

10. The container of claim 9, further comprising adjusting elements for varying the local force from the level that varies linearly along the shaft.

11. The container of claim 10, wherein the adjusting elements for varying the local force comprises a mechanism for individually varying a position of the clamping tabs.

12. The container of claim 11, wherein at least one of said clamping tabs comprises a pivotally mounted clamp plate and the adjusting elements comprise threadable spacers for varying said position of the clamping tabs.

* * * * *